Patented Oct. 10, 1944

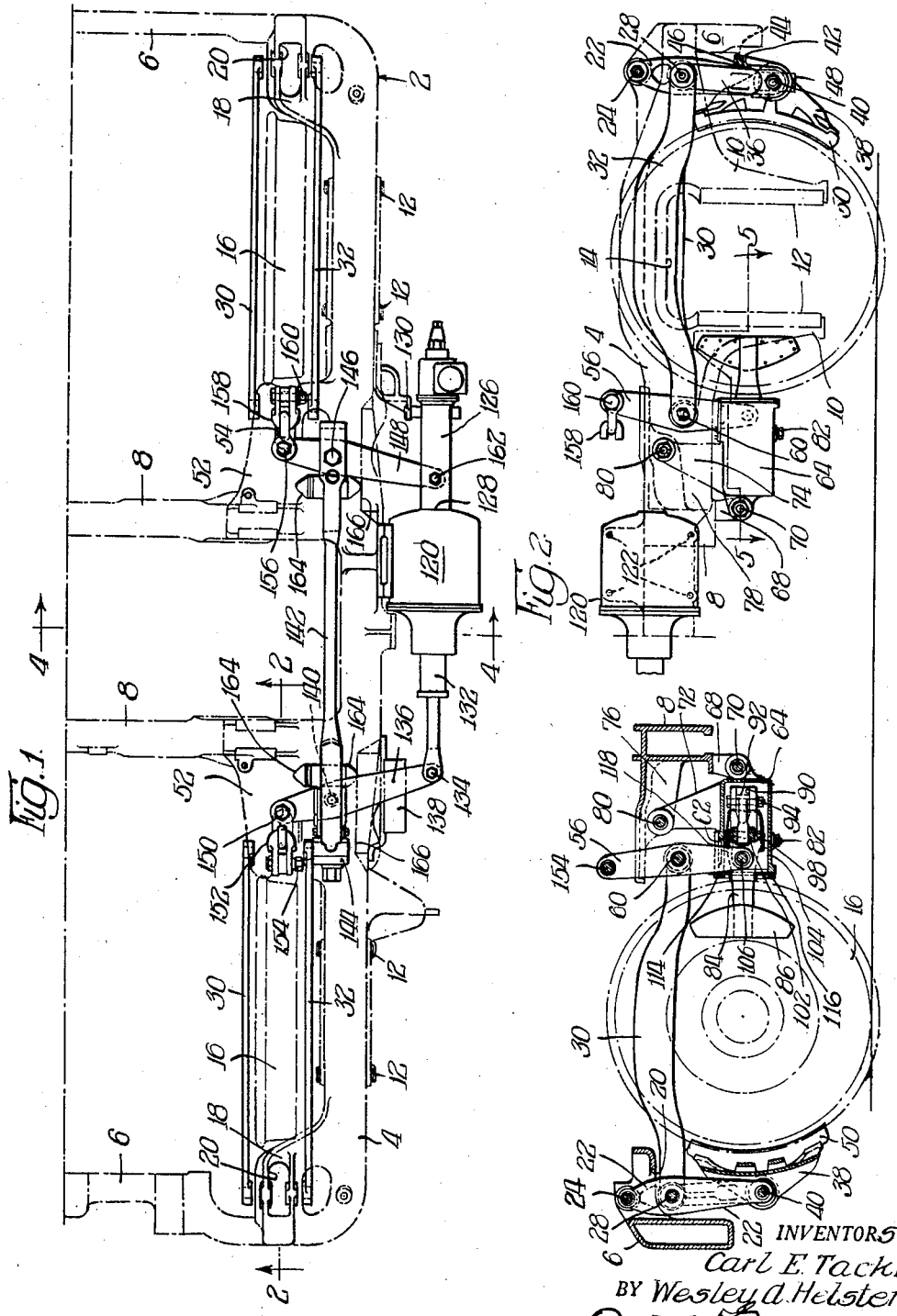

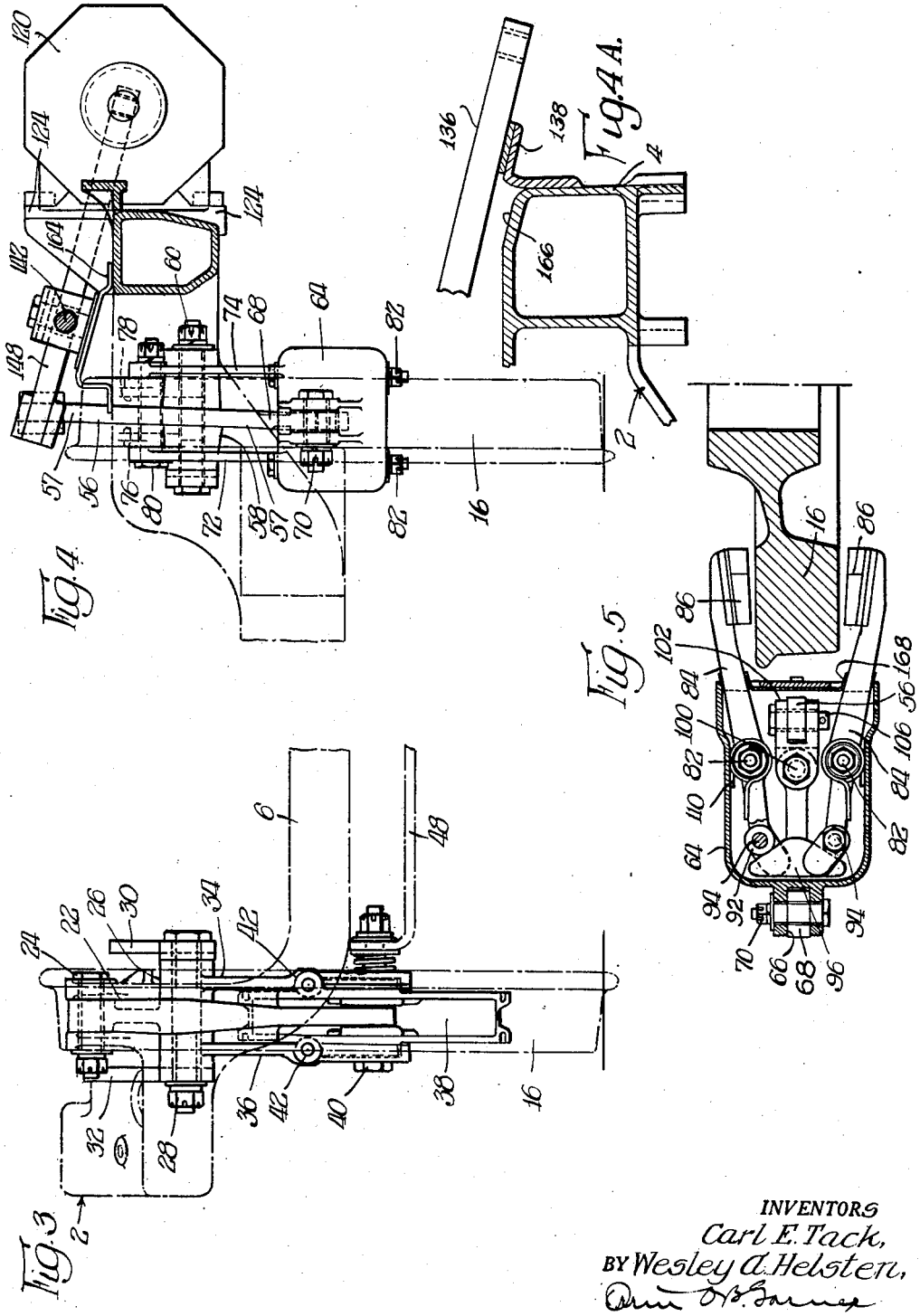

2,360,307

UNITED STATES PATENT OFFICE 2,360,307

BRAKE ARRANGEMENT

Carl E. Tack and Wesley A. Helsten, Chicago, Ill., assignors to American Steel Foundries, Chicago, Ill., a corporation of New Jersey Application April 17, 1942, Serial No. 439,370

29 Claims. (Cl. 188—33)

Our invention relates to brake rigging for a railway car truck. For many years the principal method of braking railway rolling stock has involved the application of brake shoes to the tread surfaces of the wheels. In recent years certain designs of brakes have been created in which braking forces have been applied to other than the tread surfaces of the wheels. In such brakes it has frequently been found desirable to utilize composition brake lining on the member to be braked or on the friction shoes braking said member. Accordingly, it is an object of our invention to devise an arrangement wherein friction shoes comprising composition braking material may be supported for frictional engagement with the inboard and outboard faces or sides of the rims of the associated wheels.

Our invention comprehends an arrangement wherein a housing is supported from the associated truck frame adjacent each wheel, said housing receiving the ends of a pair of levers pivotally fulcrumed intermediate the ends thereof in said housing and extending outwardly therefrom at opposite sides of said wheel to support brake shoes of the type above described, said shoes being formed and arranged for engagement with the inboard and outboard faces of the rim of the wheel.

It is well known to those skilled in the art that the application of conventional clasp brakes to the wheel and axle assemblies associated with a railway car truck results in a snubbing effect upon said assemblies which prevents uncontrolled action of the spring means interposed between the truck frame and the journal boxes of the assemblies. It is therefore an object of our invention to obtain this snubbing effect by means of a conventional brake hanger lever as well as by means of brake levers supporting off-tread brake shoes, said brake levers being supported from the truck frame by a housing as above described.

Our invention also comprises novel actuating means for the brake levers above described, said means comprising wedge means adapted to engage rollers supported from the inner ends of respective levers and thus to urge said ends apart whereby the brake shoes supported from the outer ends of said levers are urged into engagement with the associated wheel as above described.

A further object of our invention is to devise a brake arrangement wherein interconnected live and dead truck levers are supported at opposite sides of each wheel and axle assembly, said dead truck lever supporting a friction shoe for engagement with the tread surface of the associated wheel and said live truck lever actuating a pair of brake levers such as above described.

A further object of our invention is the provision of live truck levers which are slightly offset in order that the tops thereof may be aligned with the associated dead levers and in order that the bottoms thereof may be aligned with the centerlines of the associated wheels in order to permit equal pressure against opposite sides of said wheels by the associated friction shoes, said dead levers being offset from the centerlines of said wheels in order that they may support brake shoes conveniently arranged for engagement with the tread surfaces of said wheels.

A characteristic or well known phenomenon peculiar to composition brake lining is a lowering of the friction co-efficient as the speed of the braked member decreases. In other words, when composition brake lining is utilized the co-efficient of friction is sharply reduced as the speed approaches zero and this fade, as it is commonly described, is considered particularly undesirable for railway use since it makes it difficult accurately to stop a train and, moreover, it tends to lengthen a stop at the most critical point of an emergency. The contrary is true of metal to metal braking surfaces such as are more commonly used on railway equipment at the present time. In other words, the co-efficient of friction for metal to metal contact rises as the speed is reduced and this at times tends to cause the brake shoes to "seize" the wheels, thus causing wheel slippage with respect to the rails unless the braking pressure is reduced somewhat with reduction of speed. We have conceived the desirability of utilizing in conjunction the two types of braking surfaces in order to secure the advantages of both and at the same time eliminate to a degree at least the disadvantages which normally accompany the use of either alone. By this means we are able to produce a relatively smooth torque curve as compared with the torque curve which will be produced in utilizing either of the above types of brake by itself.

A further object of our invention, therefore, is to devise a novel form of brake arrangement utilizing metal to metal friction surfaces in conjunction with metal and composition braking surfaces in order to secure the advantages of both types of brakes and to eliminate the disadvantages associated with each.

A specific object of our invention is to devise a brake arrangement such as above described wherein the dead truck levers support metal friction shoes for engagement with the tread surfaces of the metal wheels and wherein the brake levers at opposite sides of each wheel support composition brake shoes for engagement with inboard and outboard surfaces on the rims of said wheels, said brake levers being actuated by means of the associated live truck levers.

Still another object of our invention is to devise a brake arrangement such as above described in which the power means is mounted on the truck frame in what is frequently called a unit cylinder arrangement, said power means being connected at opposite ends thereof to interconnected live and dead cylinder levers, each of said cylinder levers being operatively connected to the associated live truck lever, said live truck lever actuating brake levers supported at opposite sides of the associated wheel and being operatively connected to an associated dead truck lever supporting a metal friction shoe for engagement with the tread surface or periphery of said wheel.

In the drawings,

Figure 1 is a top plan view of a railway car truck embodying our invention, only one side of the truck being shown inasmuch as the arrangement is similar at opposite sides thereof.

Figure 2 is a side view of the structure shown in Figure 1, the left half thereof being a sectional view taken in the longitudinal vertical plane indicated by the line 2—2 of Figure 1 and the right half thereof being a view in elevation.

Figure 3 is an end view taken from the right as seen in Figures 1 and 2.

Figure 4 is a sectional view taken in the transverse vertical plane indicated by the line 4—4 of Figure 1, the power cylinder being shown in elevation, and Figure 4A is a fragmentary sectional view taken in a vertical transverse plane passing through the side rail adjacent the live cylinder lever.

Figure 5 is a further sectional view taken in the planes indicated by the line 5—5 of Figure 2.

In each of said figures certain details may be omitted where they are more clearly shown in other views.

Describing our invention in detail, the truck frame generally designated 2 comprises the side rails 4, 4, the end rails 6, 6 and the intermediate transverse transoms 8, 8, between which is supported in the usual manner a bolster (not shown) said bolster affording a support for a superposed car body in the usual manner. The side rail 4 at each end thereof comprises the pedestal legs 10, 10, said legs being provided with wear pads 12, 12 and defining with said side rail 4 a pedestal opening 14, receiving therewithin a journal box (not shown) said box being guideably engaged with the plates 12, 12 and affording a support in the usual manner for the journal ends of the wheel and axle assemblies indicated at 16, 16.

At the juncture of each side rail 4 with each end rail 6 the truck frame is formed with an integral gusset 18 with an opening or jaw 20 therethrough. A dead truck lever 22 is pivotally fulcrumed at 24 in the jaw 20, said lever 22 comprising a trunnion portion 26 pivotally connected at 28 to the inboard and outboard straps 30 and 32, said straps being pivotally connected at opposite ends thereof to the associated live truck lever as hereinafter more fully described. Below the trunnion portion 26 the lever 22 comprises at opposite sides thereof the integral inboard and outboard hangers 34 and 36 embracing the associated brake head 38, said head being pivotally connected by means of the bolt and nut assembly 40 to the lever 22 and to the hangers 34 and 36. Balancing means is provided for the brake head 38 and comprises housings 42, 42 pivotally connected thereto by the aforementioned bolt and nut assembly 40, each of said housings confining a coil spring 44 engaging the associated hanger at 46 (Figure 2). Each of the heads 38, 38 supports a brake shoe 50 for engagement with the periphery or tread surface of the associated wheel and the heads 38, 38 at opposite sides of the truck are held in alignment by a tie rod 48 connected at opposite ends by the bolt and nut assemblies 40, 40.

At the juncture of each side rail with each transom 8 is formed a gusset 52, said gusset being slotted as at 54 for the reception of the associated live truck lever 56 comprising intermediate its ends a trunnion portion 58 pivotally connected as at 60 to the inboard and outboard straps 30 and 32. The lower end of the lever 56 is received within an opening 62 in the top of the associated housing 64, said housing being pivotally connected to the frame by the integral jaw 66 (Figure 5) receiving the lug 68 formed on the bottom of the associated transom 8 and pivotally connected thereto by the bolt and nut assembly 70. The housing 64 is also connected to the frame by means of the spaced upstanding inboard and outboard arms 72 and 74, said arms receiving therebetween the depending inboard and outboard walls 76 and 78 formed on the associated gusset 52, said arms being pivotally connected to said walls by means of the bolt and nut assembly 80.

It will be apparent that by supporting the dead truck levers 22, 22 as well as the brake levers 84, 84 from the truck frame 2 as above described, we have provided an arrangement in which the brake rigging affords a snubbing effect upon vertical movements of the wheel and axle assemblies 16, 16.

Within the housing 64 and pivotally fulcrumed therein as at 82, 82 are a pair of levers 84, 84 supporting brake shoes 86, 86 of any suitable composition material, said shoes being formed and arranged for engagement with the inboard and outboard faces or sides of the rim of the associated wheel. It will be noted that the shoes 86, 86, as best seen in Figure 5, are tapered somewhat so that upon actuation thereof by means of the levers 84, 84 they will bear evenly against the faces of the wheel. At the inner end of each lever 84 is a jaw 90 as best seen at the left in Figure 2, said jaw receiving a roller 92 pivotally secured therein by the bolt and nut assembly 94. An actuating wedge 96 is received at opposite sides thereof within the jaws 90, 90 of the associated levers 84, 84, said actuating wedge presenting wedge surfaces engaging respective rollers 92, 92 as will be clearly apparent from a consideration of Figures 2 and 5, the outer end of the actuating wedge 96 being pivotally connected at 100 to the link 102 seated at 104 (Figure 2, left) on the bottom wall of the housing 64 and pivotally connected at 106 to the lower end of the live truck lever 56. A torsional release spring 110 is supported at the top and bottom of each lever 84 and is operative to release the lever 84 as hereinafter described.

It may be noted that the lever 56 is offset at 57, 57 so that the lower end thereof may be aligned with the centerline of the associated wheel, thus permitting equal pressure by the shoes 86, 86 against the rim of said wheel as will be clearly apparent to those skilled in the art, the upper end of said lever being aligned with the dead truck lever 22 so as to facilitate the connection therebetween inasmuch as the dead lever 22 must necessarily be offset from the centerline of the wheel whereby the supported shoe 50 may conveniently engage the tread surface of said wheel. The top of the housing 64 is closed by a cover 114 and the front end thereof is closed by a cover 116, said covers 114 and 116 being conveniently slotted for the reception respectively of the live truck lever 56 and the brake levers 84, 84, said slots being sealed by dust protectors 168, 168.

Power means in the form of a cylinder 120 is secured at 122 to the pads 124, 124 on the side rail 4 and slack adjuster means 126 of well known form is connected at 128 to one end of the cylinder 120 and is supported by means of a bracket 130 on the side rail 4. A piston rod 132 projects from the opposite end of the cylinder 120 and is pivotally connected at 134 to the live cylinder lever 136, said live cylinder lever being supported adjacent the outboard end thereof by a bracket 138 secured on the side rail 4 in any convenient manner. The live cylinder lever 136 is pivotally connected at 140 intermediate its ends to the pull rod 142, said pull rod being provided with manual slack adjuster means 144 of well known form, and being pivotally connected at the opposite end thereof as at 146 to the dead cylinder lever 148. The live cylinder lever 136 is pivotally connected at its inboard end as at 150 to the clevis means 152 pivotally connected at 154 to the associated live truck lever 56.

The dead cylinder lever 148 is pivotally connected at 156 at the inboard end thereof to the clevis means 158 pivotally connected at 160 to the associated live truck lever 56, said dead cylinder lever being connected at 162 to the slack adjuster means 126. The pull rod 142 is supported adjacent opposite ends thereof by the brackets 164, 164 supported from the truck frame in the usual manner. It may be noted that the live and dead cylinder levers 136 and 148 are diagonally arranged, and the side rail 4 is relieved at 166, 166 (Figure 1) in order to afford clearance for said cylinder levers.

In operation, compressed air in the cylinder 120 forces the piston rod 132 outwardly therefrom, thus causing the live cylinder lever 136 to rotate about the pivot point 140 in a clockwise direction whereby the associated live truck lever 56 is rotated in a clockwise direction about the pivot point 60 so that the lower end of the truck lever 56 actuates the levers 84, 84 by means of the wedge member 96 as will be clearly apparent to those skilled in the art. At the same time the associated dead truck lever 22 is actuated by means of the straps 30 and 32 whereby the brake shoe 50 is urged into engagement with the periphery of the associated wheel as heretofore described. At the same time the dead cylinder lever 148, by means of its connection through the pull rod 142 to the live cylinder lever, actuates the brake rigging at the opposite end of the truck as will be clearly apparent to those skilled in the art. The levers 84, 84, after actuation of the brake rigging as above described, will be returned to their normal inoperative position by means of the release springs 110, 110. The dead truck levers 22, 22 and the braking means associated therewith will be released by the force of gravity, as will be clearly apparent.

It is to be understood that we do not wish to be limited by the exact embodiment of the device shown which is merely by way of illustration and not limitation as various and other forms of the device will, of course, be apparent to those skilled in the art without departing from the spirit of the invention or the scope of the claims.

We claim:

1. In a brake arrangement, a vehicle frame, spaced supporting wheel and axle assemblies, interconnected live and dead truck levers at opposite sides of each assembly, brake means supported from each dead lever and adapted to engage the periphery of the associated wheel, brake means supported from said frame, operatively connected to the associated live lever, and adapted to engage the sides of the rim of the associated wheel, and actuating means operatively connected to said live truck levers, said actuating means comprising power means supported from said frame, interconnected live and dead cylinder levers connected to opposite ends of said power means and connected to respective of said live truck levers.

2. In a brake arrangement, a frame, a supporting wheel and axle assembly comprising a wheel, friction shoes positioned at the inboard and outboard sides of said wheel, a housing supported from said frame, brake levers fulcrumed intermediate their ends in said housing and connected at their outer ends to respective shoes, and actuating means associated with the inner ends of said levers, said actuating means comprising rollers supported from said levers, a wedge member positioned between said rollers, a substantially vertical lever extending into said housing, a link pivotally connected to the last-mentioned lever and pivotally connected to said wedge member, and power means operatively connected to said last-mentioned lever, said link being slidably seated on the bottom wall of said housing.

3. In a brake arrangement, a vehicle frame, spaced supporting wheel and axle assemblies, interconnected live and dead truck levers at opposite sides of each assembly, brake means supported from each dead lever and adapted to engage the periphery of the associated wheel, brake means supported from said frame, actuated by the associated live lever, and adapted to engage the sides of the rim of the associated wheel, and actuating means operatively connected to said live truck levers.

4. In a brake arrangement, a vehicle frame, spaced supporting wheel and axle assemblies, live and dead truck levers at opposite sides of each assembly, friction means supported from one of said levers and adapted for engagement with the periphery of the associated wheel and other friction means supported from said frame, actuated by the other of said levers, and adapted for engagement with the sides of said wheel, and actuating means connected to said live truck lever.

5. In a brake arrangement, a vehicle frame, spaced supporting wheel and axle assemblies, live and dead truck levers at opposite sides of each assembly, metal friction means supported from one of said levers and adapted for engagement with the periphery of the associated wheel and friction means of a different character supported by said frame, actuated by the other of said levers, and adapted for engagement with the sides of said wheel, and actuating means associated with said levers.

6. In a brake arrangement, a frame member, a supporting wheel and axle assembly comprising a wheel and braking means therefor comprising friction means adapted to engage the periphery of said wheel and other friction means adapted to engage the sides thereof, and actuating means comprising interconnected substantially vertical live and dead truck levers connected at their lower ends to respective friction means and power means operatively connected to the upper end of said live truck lever.

7. In a brake arrangement, a frame member, a supporting wheel and axle assembly comprising a wheel and braking means therefor comprising a metal friction shoe adapted to engage the periphery of said wheel and composition friction shoes adapted to engage the sides thereof, and actuating means comprising interconnected substantially vertical live and dead truck levers lying in the plane of said wheel and operatively connected at their lower ends to respective friction shoes, and power means operatively connected to the upper end of said live truck lever.

8. In a brake arrangement, a frame member, a supporting wheel and axle assembly comprising a wheel, and braking means therefor comprising friction means adapted to engage the periphery of said wheel and other friction means adapted to engage the sides of the rim thereof, and actuating means comprising substantially vertical live and dead truck levers connected intermediate their ends and associated at their lower ends with respective friction means and a power cylinder operatively connected to said live truck lever, said levers being disposed substantially in the plane of said wheel.

9. In a brake arrangement, a wheel and axle assembly comprising a wheel, interconnected live and dead truck levers at opposite sides thereof, friction means operatively connected to said levers for braking said wheel, and actuating means connected to said live lever, said dead lever being offset from the centerline of said wheel and said live lever being aligned at the top thereof with said dead lever and being aligned at the bottom thereof with said center-line, the friction means associated with the dead lever being adapted to engage the periphery of said wheel and the friction means associated with the live lever being adapted to engage inboard and outboard sides of said wheel.

10. In a brake arrangement, a truck frame, spaced supporting wheel and axle assemblies, interconnected live and dead truck levers at opposite sides of each assembly, friction means actuated by certain of said levers for engagement with inboard and outboard sides of the adjacent wheels, and friction means actuated by other of said levers for engagement with the peripheries of said wheels, a power cylinder mounted on said frame, interconnected live and dead cylinder levers connected at opposite ends of said cylinder, and an operative connection between each cylinder lever and the adjacent live truck lever.

11. In a brake arrangement, a truck frame, spaced supporting wheel and axle assemblies, interconnected live and dead truck levers at opposite sides of each assembly, friction means actuated by the live levers for engagement with inboard and outboard sides of the associated wheels, friction means actuated by the dead levers for engagement with the peripheries of said wheels, a power cylinder mounted on said frame, interconnected live and dead cylinder levers connected to opposite ends of said cylinder, and an operative connection between each cylinder lever and the adjacent live truck lever.

12. In a brake arrangement, a wheel and axle assembly comprising an axle and a member rotatable therewith, friction means at opposite sides of said member for engagement therewith, a housing, brake levers fulcrumed intermediate their ends within said housing and supporting respective of said friction means, a wedge member between said levers adjacent the inner ends thereof and adapted to actuate said levers, a link seated on the bottom wall of said housing and pivotally connected to said wedge member, and an actuating lever extending into said housing and pivotally connected to said link.

13. In a brake arrangement, a railway car truck comprising a side member and end rails, spaced supporting wheel and axle assemblies, power means on said side member, live and dead cylinder levers connected at opposite ends to said power means and adjustably connected to each other, and braking means associated with each wheel and operatively connected respectively to said cylinder levers and comprising a live brake lever supported intermediate the wheels, a dead brake lever supported outwardly of the wheel, straps connecting said brake levers, and wheel braking means associated with each of said brake levers, at least one of said wheel braking means having braking engagement with inboard and outboard faces of the adjacent wheel, and the other of said wheel braking means having braking engagement with the tread surface of said wheel.

14. In a brake arrangement, a railway car truck comprising a side member and end rails, spaced supporting wheel and axle assemblies, power means on said side member, live and dead cylinder levers connected at opposite ends of said power means and adjustably connected to each other, and braking means associated with each wheel and operatively connected respectively to said cylinder levers and comprising a live brake lever supported intermediate the wheels, a dead brake lever supported outwardly of the wheel, straps connecting said brake levers, and wheel braking means associated with each of said brake levers, one of said wheel braking means engaging the tread surface thereof and the other of said wheel braking means engaging inboard and outboard faces of said wheel.

15. In a brake arrangement, a railway car truck comprising a side member and end rails, spaced supporting wheel and axle assemblies, power means on said side member, live and dead cylinder levers connected at opposite ends to said power means and adjustably connected to each other, and braking means associated with each wheel and operatively connected respectively to said cylinder levers and comprising a live brake lever supported intermediate the wheels, a dead brake lever supported outwardly of the wheel, straps connecting said brake levers, and wheel braking means associated with each of said brake levers, at least one of said wheel braking means having braking engagement with inboard and outboard faces of the adjacent wheel.

16. In a brake arrangement for a wheeled railway car truck, a truck frame having a side member, power means thereon, interconnected live and dead cylinder levers connected at opposite ends to said power means, and braking means for each wheel at one side of the truck connected respectively to the opposite ends of said cylinder levers, each of said braking means comprising interconnected live and dead brake levers supported at opposite sides of the wheel, one of said brake levers actuating wheel tread braking means, and the other of said brake levers actuating clasp brake means for engaging inboard and outboard braking surfaces on said wheel.

17. In a brake arrangement for a four wheel railway car truck, a frame, supporting wheel and axle assemblies, each of said wheels having a tread braking surface and other braking surfaces, and brake rigging for each side of the truck comprising power means mounted on the side of said frame, live and dead cylinder levers connected at corresponding ends to opposite ends of said power means and connected to each other, and an operative connection between each cylinder lever and braking means associated with the adjacent wheel, each of said braking means including a metal shoe engaging said tread surface, a plurality of composition brake material means engaging said other surfaces, each of said braking means comprising a metal brake shoe engaging said tread surface at one side of the wheel, and clasp brake means including composition braking material engaging said other surfaces at the opposite side of said wheel.

18. In a brake arrangement for a four wheel railway car truck, a truck frame, supporting wheel and axle assemblies, and brake rigging for each side of the truck comprising power means mounted on the side of said frame, interconnected live and dead cylinder levers connected at their outboard ends to said power means and at their inboard ends to brake means associated with the wheels at opposite ends of the truck, each of said brake means comprising truck levers supported at opposite sides of the wheel, a connection between said truck levers, a brake shoe associated with one of said truck levers for braking engagement with the tread surface of said wheel, and clasp brake means associated with the other of said truck levers and including brake shoes arranged for engagement with inboard and outboard faces of said wheel.

19. In a brake arrangement for a four wheel railway car truck, a frame, supporting wheel and axle assemblies, each of said wheels having a tread braking surface and other braking surfaces, and brake rigging for each side of the truck comprising power means mounted on the side of said frame, live and dead cylinder levers connected at corresponding ends to opposite ends of said power means and connected to each other, and an operative connection between each cylinder lever and braking means associated with the adjacent wheel, each of said braking means including a metal shoe engaging said tread surface, and a plurality of composition brake material means engaging said other surfaces.

20. In a brake arrangement for a four wheel railway car truck, a frame, supporting wheel and axle assemblies, each of said wheels presenting a tread braking surface and inboard and outboard braking faces, and brake rigging for each side of the truck comprising power means mounted on the side of said frame, live and dead cylinder levers connected at corresponding ends to opposite ends of said power means and adjustably connected to each other, and an operative connection between each cylinder lever and braking means associated with the adjacent wheel, each of said braking means comprising a metal shoe engaging said surface, and composition shoes engaging said faces.

21. In a brake arrangement for a four wheel truck, a frame, wheel and axle assemblies, and brake rigging for each side of the truck comprising power means mounted on said frame, interconnected cylinder levers connected at corresponding ends to said power means, and braking means for respective wheels operatively connected to the opposite ends of said cylinder levers, each of said braking means including a metal shoe engaging the wheel tread and composition brake shoes engaging inboard and outboard faces of the wheel.

22. In a railway car truck, a frame, spaced supporting wheels, and braking means for each wheel comprising substantially vertical interconnected levers at opposite sides of said wheel and lying in the plane thereof, one of said levers actuating a metal shoe for tread engagement with said wheel and the other of said levers actuating means clasping said wheel.

23. In a brake arrangement for a railway car truck, a truck frame, spaced supporting wheel and axle assemblies, power means on said frame and brake rigging comprising interconnected live and dead cylinder levers connected at opposite ends of said power means, single shoe and clasp brake means associated with each wheel, and operative connections between said cylinder levers and the adjacent wheel brake means, each of said clasp brake means comprising composition brake shoes engaging inboard and outboard faces of the associated wheel.

24. In a brake arrangement for a railway car truck, a truck frame, spaced supporting wheel and axle assemblies, power means on said frame, and brake rigging comprising interconnected live and dead cylinder levers connected at opposite ends of said power means, single shoe and clasp brake means frictionally engaging each wheel, and operative connections between said cylinder levers and the adjacent wheel brake means.

25. In a brake arrangement, braking means for a single wheel comprising interconnected substantially vertical live and dead truck levers supported at opposite sides thereof and lying in the plane thereof, single shoe brake means associated with the lower end of one of said levers, clasp brake means associated with the lower end of the other of said levers, and actuating means for one of said levers.

26. In a brake arrangement for a railway car truck, a frame, spaced supporting wheel and axle assemblies, power means mounted on the side of said frame, brake rigging at the adjacent side of the truck comprising interconnected live and dead cylinder levers connected at corresponding ends to opposite ends of said power means, and braking means associated with each wheel and connected at the other ends of said cylinder levers respectively, each of said braking means comprising interconnected live and dead truck levers supported at opposite sides of the adjacent wheel, a metal brake shoe supported from one of said brake levers for engagement with the tread of the wheel, and clasp composition shoes operatively connected to the other of said brake levers for engagement with inboard and outboard faces of said wheel.

27. In a brake arrangement for a railway car truck, a frame, spaced supporting wheel and axle assemblies, power means, braking means for each wheel, and operative connections between the braking means at each side of the truck and the adjacent power means, each of said braking means comprising interconnected substantially vertical live and dead truck levers at opposite sides of the wheel disposed in the plane thereof, one of said truck levers supporting a metal brake shoe for engaging the tread of the wheel and the other of said truck levers having operative connection to clasp brake means at the opposite side of the wheel.

28. In a brake arrangement, a truck frame, spaced supporting wheel and axle assemblies, each comprising an axle and a wheel rotatable therewith, power means on said frame, interconnected live and dead cylinder levers connected at corresponding ends thereof to opposite ends of said power means, friction shoes for engagement with inboard and outboard sides of each wheel, a truck lever operatively connected to said shoes, and an operative connection between said truck lever and the adjacent cylinder lever.

29. In a brake arrangement for a wheel, friction means formed and arranged for engagement with a radial surface of said wheel, friction means for engagement with the peripheral surface of said wheel, and actuating means for said friction means comprising substantially vertical interconnected live and dead truck levers at opposite sides of said wheel lying in the plane thereof and operatively associated with said friction means.

CARL E. TACK.
WESLEY A. HELSTEN.